(12) United States Patent
Smith et al.

(10) Patent No.: US 8,251,238 B2
(45) Date of Patent: Aug. 28, 2012

(54) TWO-PIECE CLOSURE DEVICE

(75) Inventors: Dennis R. Smith, Tulsa, OK (US); Eric N. Freeman, Kiefer, OK (US); Graham Christopher Stilwell, Swindon (GB); Charles Culver Gidden Cooper, Arvada, CO (US); Gregory Allen Langley, Arvada, CO (US); Scott Douglas Nelson, Denver, CO (US)

(73) Assignee: TDW Delaware Inc., Wilmington, DE (US)

( * ) Notice: Subject to any disclaimer, the term of this patent is extended or adjusted under 35 U.S.C. 154(b) by 670 days.

(21) Appl. No.: 12/236,217

(22) Filed: Sep. 23, 2008

(65) Prior Publication Data

US 2010/0072204 A1   Mar. 25, 2010

(51) Int. Cl.
*B65D 53/00* (2006.01)

(52) U.S. Cl. .......................... 220/234; 220/321

(58) Field of Classification Search .................. 220/234, 220/391, 321, 318; 49/394; 70/91; 292/288
See application file for complete search history.

(56) References Cited

U.S. PATENT DOCUMENTS

| | | |
|---|---|---|
| 3,155,116 A | 11/1964 | Ver Nooy |
| 3,876,385 A | 4/1975 | Markus et al. |
| 4,058,142 A | 11/1977 | Rankin |
| 4,159,063 A | 6/1979 | Weber et al. |
| 4,237,936 A | 12/1980 | Lollis et al. |
| 4,307,818 A | 12/1981 | Singh et al. |
| 4,387,740 A | 6/1983 | Vanzant |
| 4,466,550 A | 8/1984 | Sullivan |
| 4,515,287 A | 5/1985 | Baudoux et al. |
| 4,693,278 A | 9/1987 | Wilson et al. |
| 5,740,845 A | 4/1998 | Bonora et al. |
| 5,975,142 A | 11/1999 | Wilson |
| 6,286,553 B1 | 9/2001 | Morgan |

(Continued)

FOREIGN PATENT DOCUMENTS

| | | |
|---|---|---|
| EP | 0129349 | 12/1984 |
| GB | 2214601 | 9/1989 |

OTHER PUBLICATIONS

International Search Report and Written Opinion issued by the International Searching Authority (ISA/US) in corresonding PCT/US09/30812 on Mar. 2, 2009; 9 pgs.
International Preliminary Report on Patentability issued by the International Bureau, Geneva, Switzerland on Apr. 7, 2011 in PCT/US2009/030812.

*Primary Examiner* — David Fidei
*Assistant Examiner* — Raven Collins
(74) *Attorney, Agent, or Firm* — Gable Gotwals

(57) ABSTRACT

A closure device includes a door carrying a series of interconnected shear blocks and a keystone shear block designed to transfer stresses created by pressure acting on the door to a surrounding hub. Each interconnected shear block has a limited rotation relative to its adjacent blocks. A holding band operating handle is in communication with a driving link which, in turn, is in communication with the keystone shear block. Actuating the handle causes the keystone shear block to move in an upward vertical direction. The linear movement of the keystone shear block allows the limited rotation of the interconnected shear blocks to occur, thereby causing the circumferential holding band to collapse within itself from an expanded-engaged position to a contracted-removed position relative to said hub. A pressure warning lock provides a safety device and prevents actuation of the holding band operating handle when the pressure chamber is under pressure.

17 Claims, 8 Drawing Sheets

U.S. PATENT DOCUMENTS

| | | |
|---|---|---|
| 6,439,415 B1 | 8/2002 | Salim et al. |
| 6,851,452 B2 | 2/2005 | Smith |
| 7,036,674 B2 | 5/2006 | McGuire |
| 7,051,897 B2 | 5/2006 | McGuire |
| 7,341,161 B2 | 3/2008 | McGuire |
| 2005/0161957 A1* | 7/2005 | McGuire ................ 292/288 |
| 2009/0084790 A1* | 4/2009 | Haibel ................ 220/318 |

* cited by examiner

TWO-PIECE CLOSURE DEVICE

FIELD OF INVENTION

The present invention relates to closures for sealing the end of a pressure chamber, such as a pipe or pipeline. More specifically, the invention is a new type of closure device to retain the closure door in a closed position and withhold the pressure from a pipeline.

BACKGROUND OF THE INVENTION

Current pipeline closures use a varying range of means to withhold the pipeline pressure and retain the door closed, including simple threaded features, interlocking bayonet style connections, large clamps, and narrow flexible compression bands. For example, U.S. Pat. Nos. 7,051,897 and 7,341,161, issued May 30, 2006 and Mar. 11, 2008 to McGuire disclose a circumferential locking member having locking segments that are either carried by a thin carrier band or by partial carrier band segments. (McGuire also discloses interconnected locking segments.) A slot segment located between opposing ends of the locking member completes the 360° pressure bearing surface, and a linkage mechanism interconnects a lever with the opposing ends. Actuating the lever effectively pulls the two ends of the locking member together so that the locking member is in a radially retracted position. The slot segment, however, is removed in a completely separate and independent action from that of the lever.

No current closure uses a single series of shear blocks to retain pipeline pressure, the shear blocks being linked together in such a way as to allow the entire assembly to retract and collapse within itself. Nor does any current closure place the holding band in communication with an operating lever such that actuating the lever results in automatic simultaneous actuation of a keystone shear block, thereby causing the holding band to expand or contract.

SUMMARY OF THE INVENTION

A closure device according to this invention includes a hub having an access port and connected to a pressure chamber, such as a pipe or a pipeline. A door sized to close off the access port carries a circumferential holding band that is made up of a series of interconnected shear blocks and a keystone shear block. The interconnected shear blocks have a limited rotation relative to one another. A linear movement of the keystone shear block allows the limited rotation to occur, causing the circumferential holding band to collapse within itself from an expanded-engaged position to a contracted-removed position relative to said hub.

When in the expanded-engaged position, a portion of the shear blocks and keystone shear block are retained by a circumferential groove in the hub. The shear blocks and the keystone shear block have a thickness "t" that is effective for transferring a stress created by a pressure acting on an inner face of the door to the hub when the holding band is in the expanded-engaged position. When in the contracted-removed position, the circumferential holding band is retained by a side wall located on the outer face of the door.

The interconnected shear blocks are one of two types: a mid-band shear block and an end-band shear block. Each mid-band shear block has a first end and a second end and a pin connects the second end of one block to the first end of an adjacent block. The first and second ends may have a mating configuration, with one end receiving the opposing end of an adjacent block. Alternately, the ends may be flat surfaces and a plate link may be used for connecting adjacent blocks in combination with the pin. Similarly, the end-band blocks have a first and a second end, with the first end being mated or connected to the opposing end of an adjacent mid-band shear block. The second end of the end-band block is in communication with the keystone shear block.

A holding band operating handle is in communication with a driving link which, in turn, is in communication with the keystone shear block. Actuating the handle causes the keystone shear block to move in an upward vertical direction. The linear movement and alignment of the keystone shear block is controlled in part by standoff pins that ride in a slot of a face plate connected to the door.

The closure device also includes a pressure warning lock. The pressure warning lock is received by a portion of the holding band operating handle. In the engaged position, the pressure warning lock prevents movement of the holding band operating handle.

A better understanding of the closure device will be obtained from the following detailed description of the preferred embodiments and claims, taken in conjunction with the attached drawings.

DETAILED DESCRIPTION OF THE PREFERRED EMBODIMENTS

Figure 1:
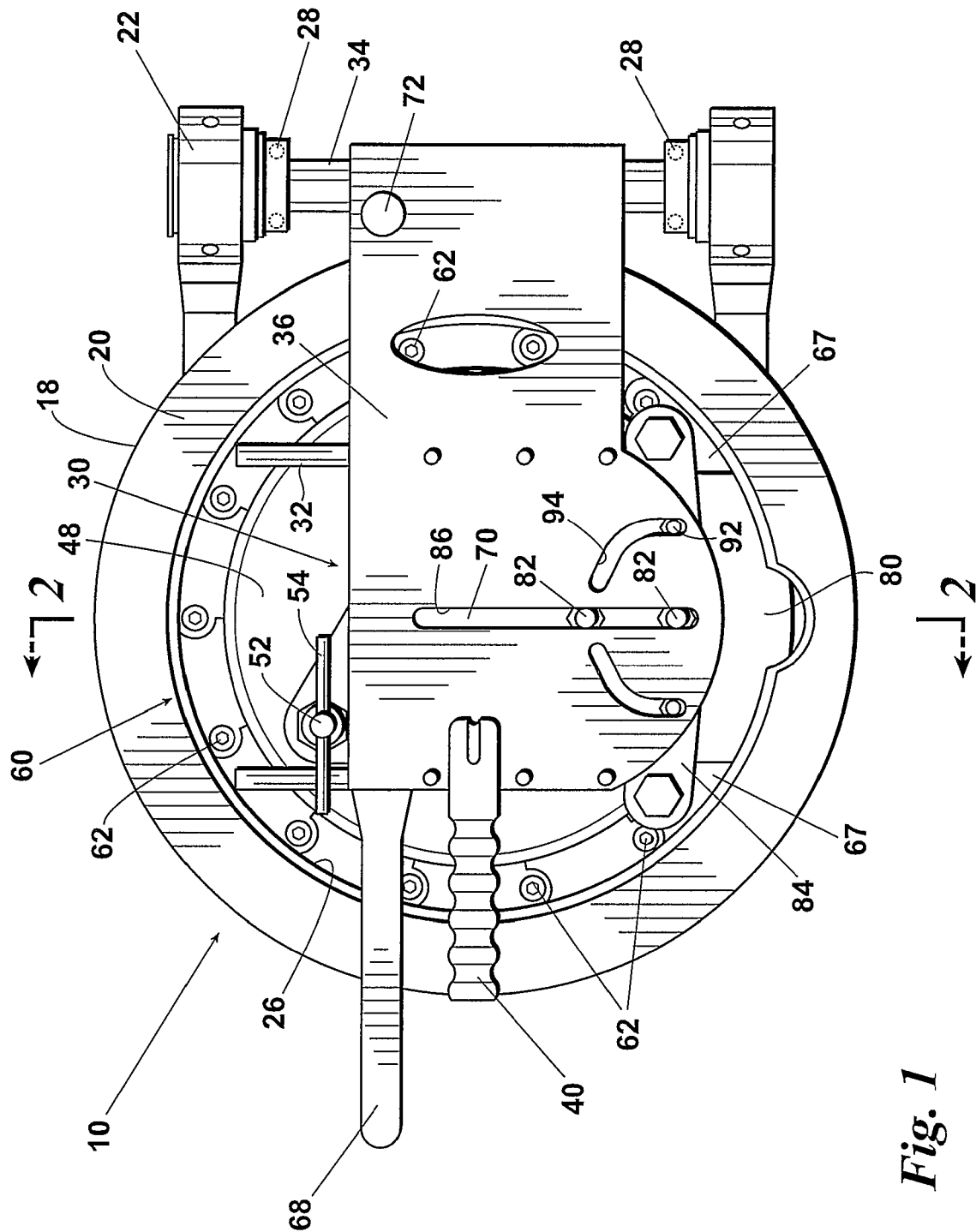
FIG. 1 is a front view of the two-piece closure device in its locked and engaged position within an access port of a hub connected to a pressure chamber. A series of interconnected shear blocks and a keystone shear block form a circumferential holding band that transfers the stresses created by chamber pressure acting upon the interior face of the closure door to the hub.
Figure 2:
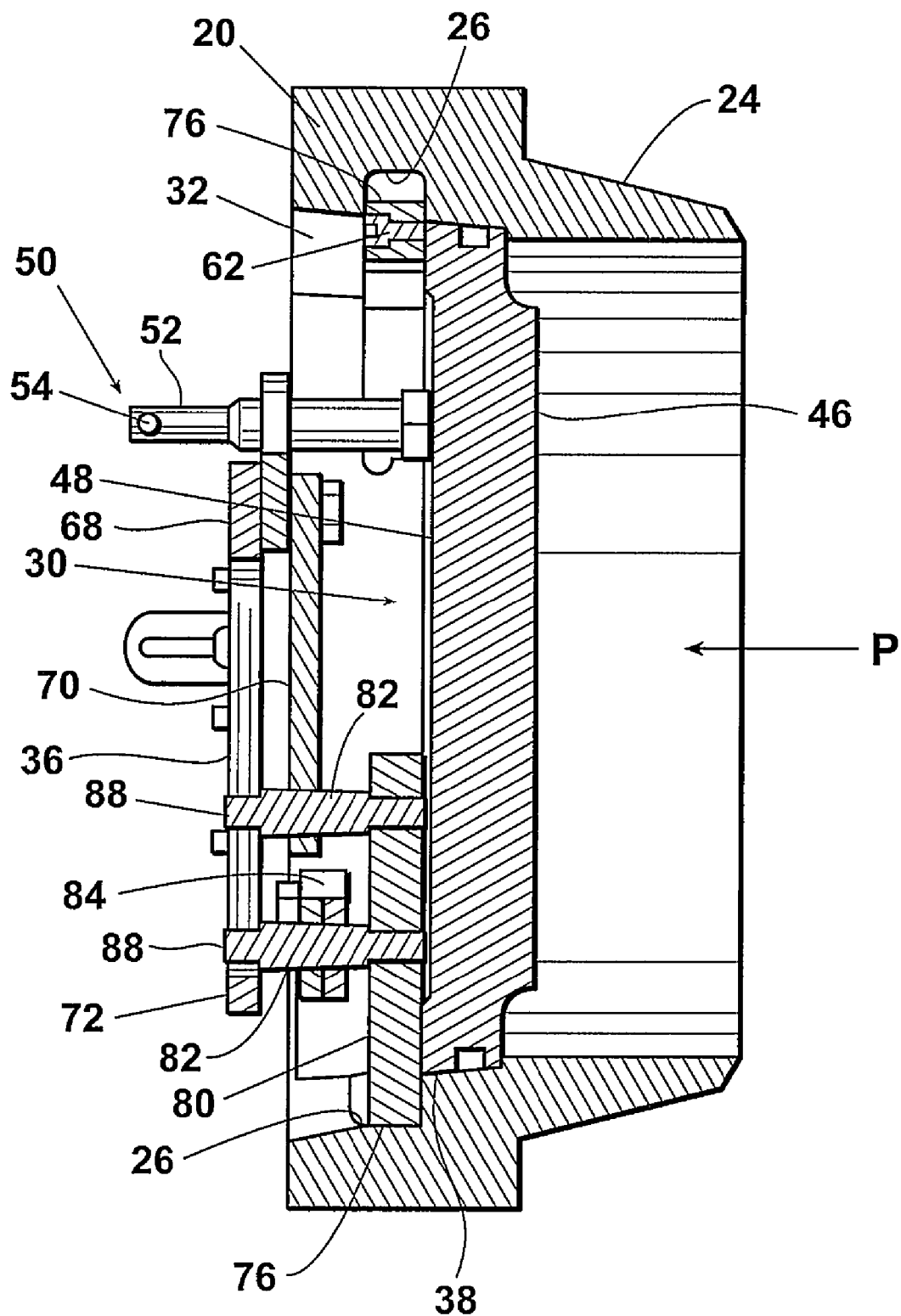
FIG. 2 is a view of the closure device taken along section line 2-2 of FIG. 1. The circumferential holding band is received by a circumferential groove in the hub. The keystone shear block is connected to a holding band operating handle.
Figure 3:
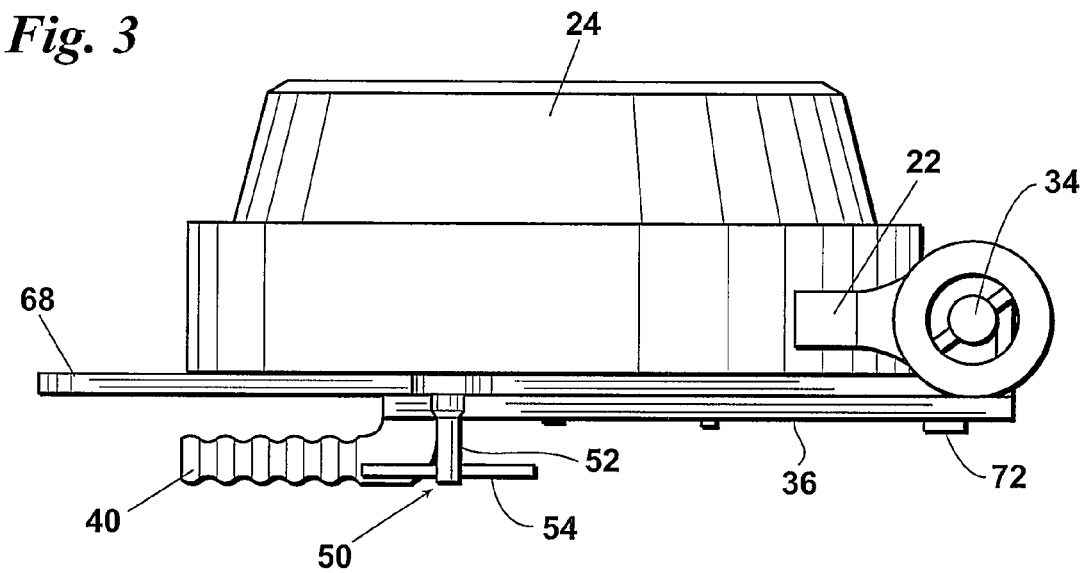
FIG. 3 is a top view of the closure device in its locked and engaged position. A door handle and a pressure warning lock, which is received by the holding band operating handle, are provided.
Figure 4:
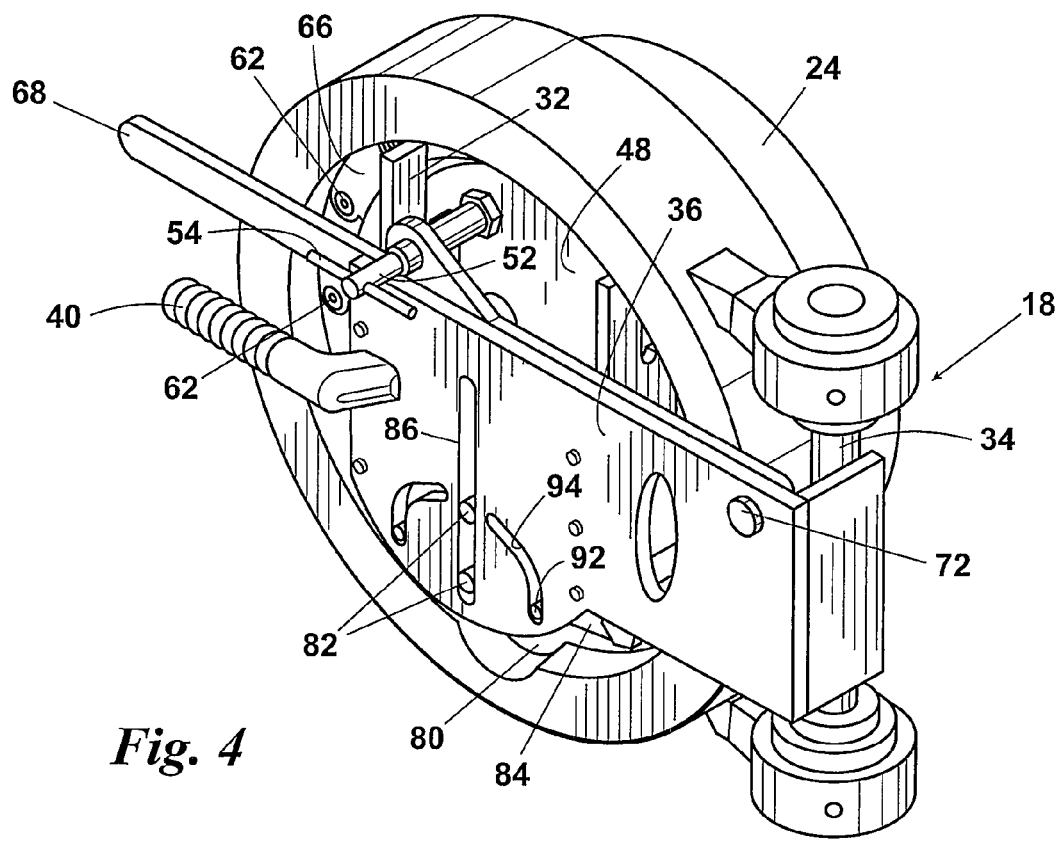
FIG. 4 is an isometric view of the closure device in its locked and engaged position. When engaged, the pressure warning lock prevents an operator from moving the holding band operating handle.
Figure 5:
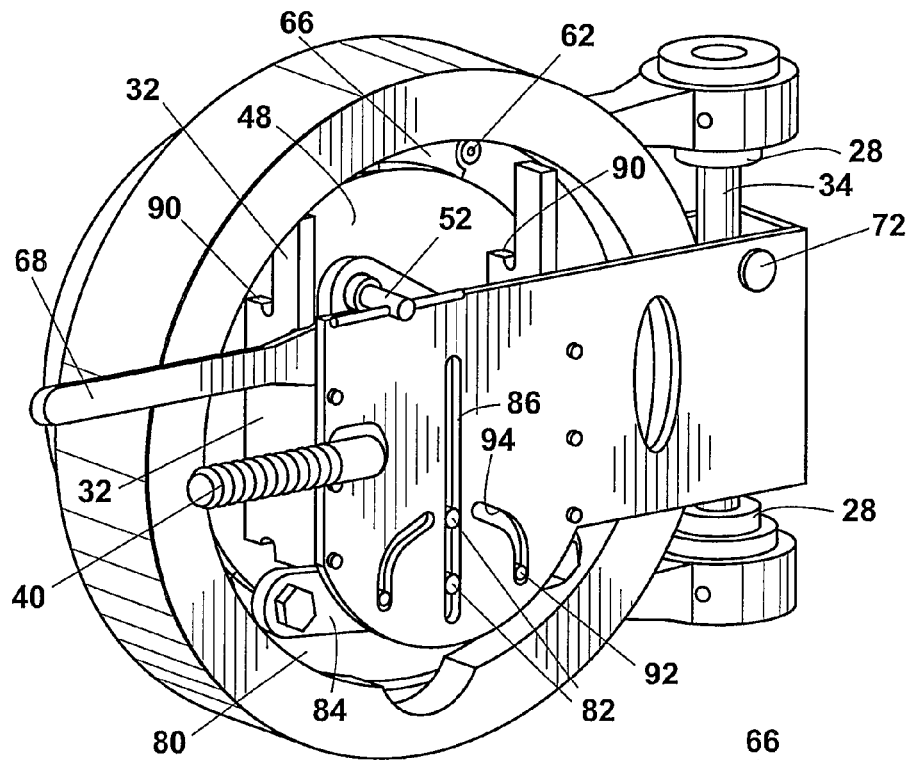
FIG. 5 illustrates the closure device with the circumferential holding band in the locked and engaged closed position.
Figure 6:
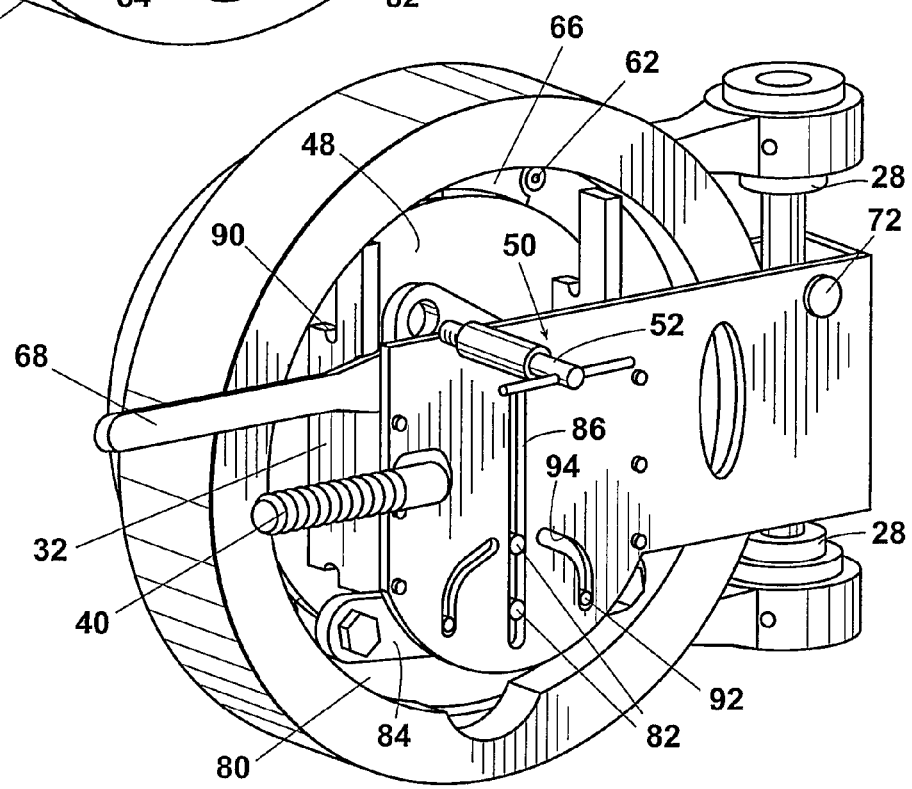
FIG. 6 illustrates the closure device in the unlocked and engaged position. The pressure warning lock is disengaged and no longer preventing an operator from moving the holding band operating handle.
Figure 7:
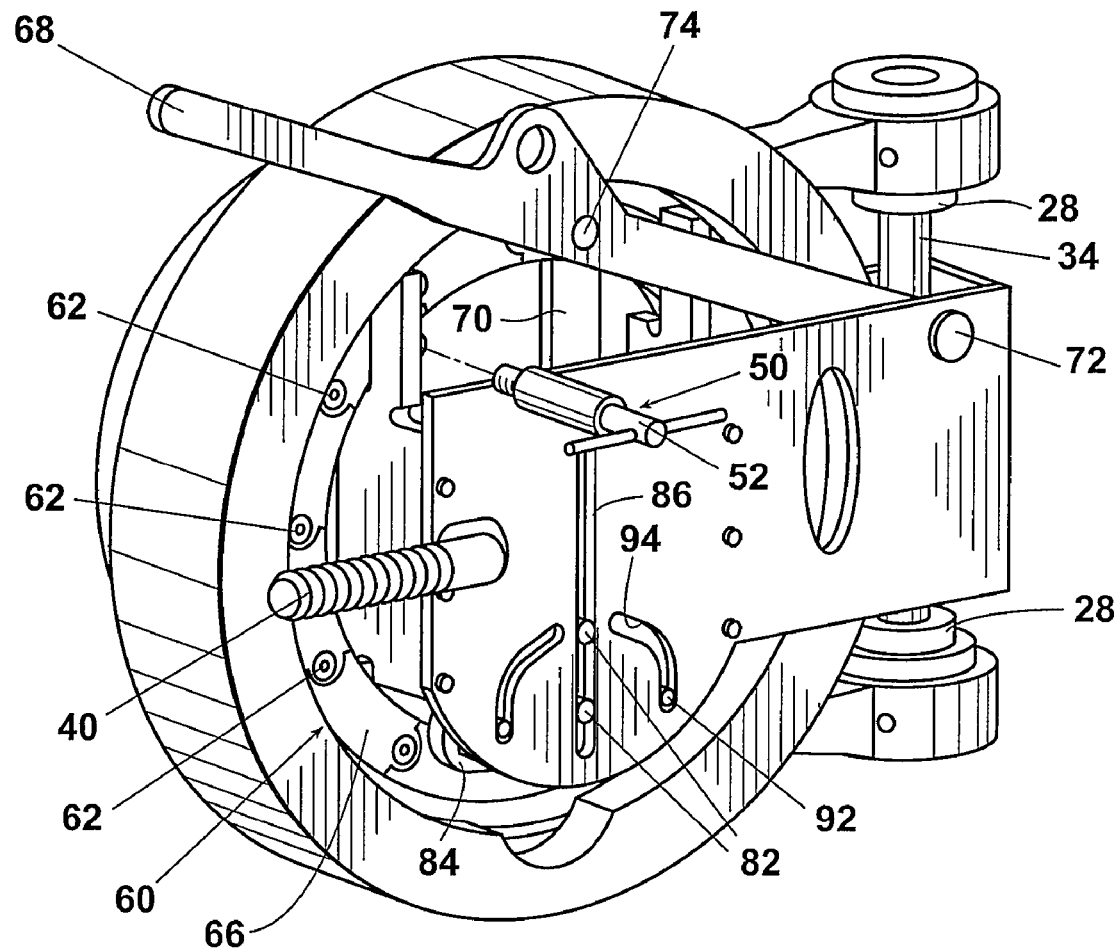
FIG. 7 illustrates the closure device in the unlocked and disengaged position. Lifting the holding band operating handle causes the keystone shear block to move in a vertical direction which, in turn, causes the shear blocks to rotate. The limited rotation of the shear blocks then causes the holding band to collapse and retract within itself. Side walls capture and retain the collapsed holding band.
Figure 8:
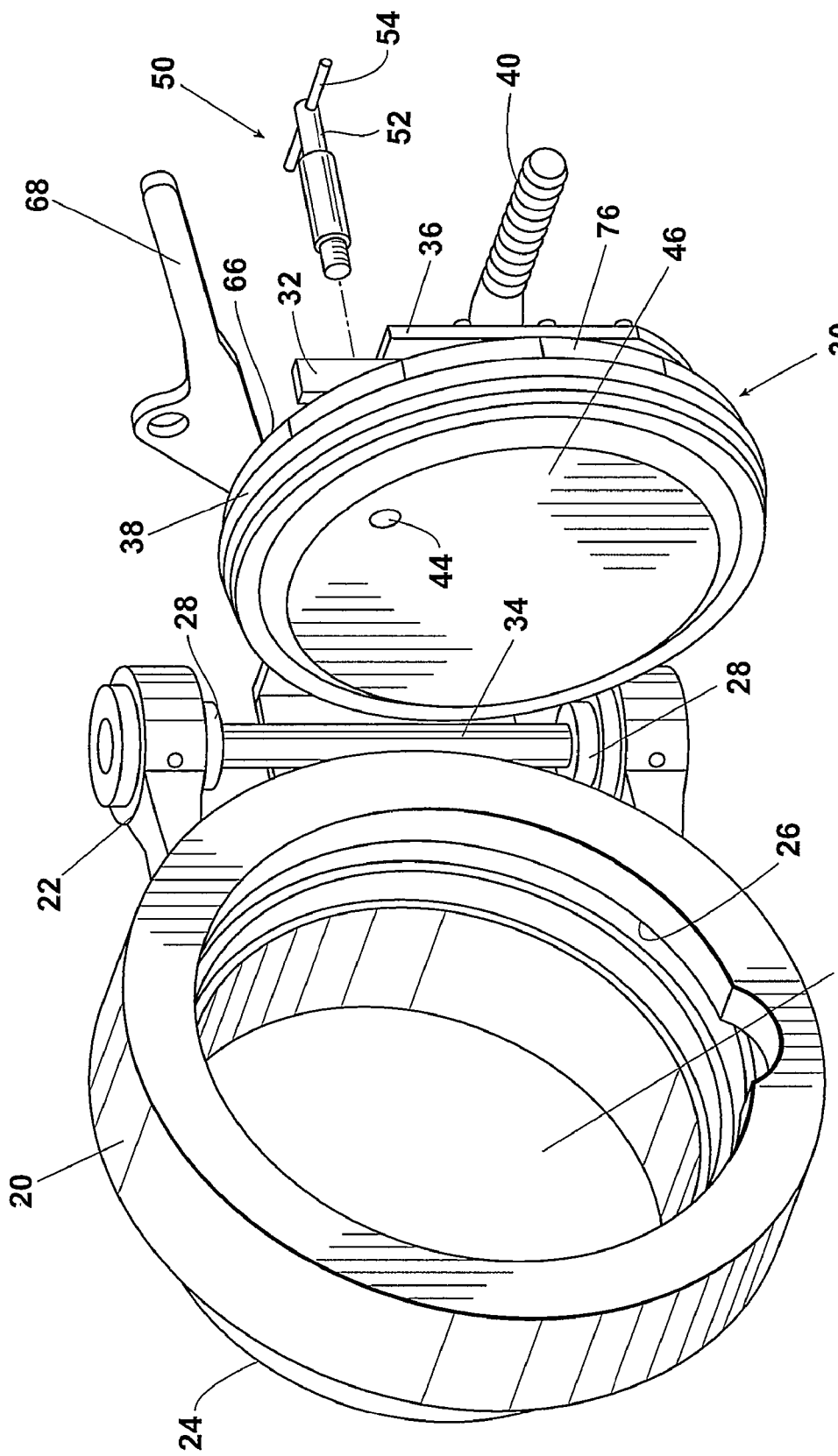
FIG. 8 illustrates the closure device in the open position, providing access to an interior space of the pressure chamber.

Preferred embodiments of the two-piece closure will now be described with reference to the drawings and the elements illustrated in the drawings. The elements are identified by the following numbers:

| | |
|---|---|
| 10 | Closure device |
| 12 | Access port |
| 18 | Circumferential edge |
| 20 | Hub |
| 22 | Hinge arm |
| 24 | Neck |
| 26 | Groove |
| 28 | Hinge arm |
| 30 | Door |
| 32 | Side wall |
| 34 | Hinge post |
| 36 | Face plate |
| 38 | Outer edge |
| 40 | Door opening handle |
| 44 | Threaded hole |
| 46 | Interior face |
| 48 | Exterior face |
| 50 | Pressure warning lock |
| 52 | Threaded shaft |
| 54 | Handle |
| 60 | Holding band |
| 62 | Pin |
| 63 | End |
| 64 | End |
| 65 | Recess |
| 66 | Mid-band shear block |
| 67 | End-band shear block |
| 68 | Holding band operating handle |
| 69 | Shear block plate link |
| 70 | Handle link |
| 72 | Pivot pin |
| 74 | Pivot pin |
| 76 | Holding band edge |
| 80 | Keystone shear block |
| 82 | Standoff pin |
| 84 | Driving link |
| 86 | Vertical slot |
| 88 | Standoff pin end |
| 90 | Side wall tab |
| 92 | Standoff pin |
| 94 | Arcuate-shaped slot |

Referring to FIGS. 1 to 4, a two-piece closure device 10 provides a quick-acting closure to gain access to the interior of a pressure chamber such as a pipeline (not shown) when closure 10 is open, but withholds internal pressure when closure 10 is closed. Closure 10, when in the closed and locked position, is capable of retaining pressure P in the chamber by transferring the stress caused by pressure P from the inside surface 46 of the door 30 back into the hub 20. Hub 20, which is welded onto the end of the chamber opening, is of a type well-known in the art and typically includes a reduced neck portion 24. The pressure P on the entire inside surface 46 of the door 30 creates stresses in the door 30 which are transferred to the outer edge 38 of the door 30 though the door geometry. These stresses are then transferred into the circumferential holding band 60. The stresses that are transferred into the holding band 60 are then transferred into the hub 20 because the edge 76 of the holding band 60 is captured in a groove 26 in the hub 20. The geometry of groove 26 and the material around the groove 26 are designed in such a manner that the hub 20 is capable of withholding the stresses that will be transferred into it from a predetermined range of internal pressures P.

The holding band 60 is the actual mechanism within the closure device 10 that converts from an expanded position—in which the holding band 60 is transferring stresses from the chamber pressure P into the hub 20—to a contracted position, where holding band 60 will have retracted from the hub 20 and moved out of the way and allow the door 30 to be opened by an operator. Holding band 60 includes an interconnected series of mid-band shear blocks 66, two end-band shear blocks 67 each linked to an adjacent mid-band shear block 66, and a keystone shear block 80 in communication with the end-band shear blocks. Simple unlocking and opening movements will allow the door 30 to open and allow access to the contents of the chamber through access port 12.

FIGS. 5 to 8 illustrate closure device 10 as it passes from a locked and engaged position to an unlocked, disengaged open position. Closure device 10 is designed in such a way that the operator cannot open the door 30 without first unlocking the door 30. The process of unlocking the door 30 includes removing a pressure warning lock 50 that includes a threaded shaft 52 and a handle 54. See FIG. 6. Threaded shaft 52 is received by a threaded through-hole 44 within door 30. See FIG. 8. Pressure warning lock 50 will warn the operator if there is any remnant pressure P within the chamber. In this manner closure device 10 warns the operator of a possible dangerous situation within the chamber before the door 30 is opened. When engaged, pressure warning lock 50 prevents the movement of holding band operating handle 68, thereby ensuring that holding band 60 remains in an expanded-engaged position. See FIG. 5.

Once the operator is reassured that the chamber is not pressurized and the door 30 is unlocked, the operator can then disengage the holding band 60 from the hub 20 by actuating the holding band operating handle 68. See FIG. 7. Holding band operating handle 68 is pivotally connected to face plate 36 by pivot pin 72, and a handle link 70 is pivotally connected to handle 68 by pivot pin 74. Activating operating handle 68 will cause the holding band 60 to convert from an expanded-engaged position to a contracted-removed position. The door 30 would now be disengaged from the hub 20 and able to be opened through the door opening handle 40 See FIG. 8.

Referring once again to FIGS. 1 to 4, circumferential holding band 60 is assembled out of a series of interconnected mid-band shear blocks 66, two end-band shear blocks 67, and a keystone shear block 80. The shear blocks 66, 67, 80 transfer the pressure P of the chamber acting on the door 30 back into the hub 20. The holding band 60 in the expanded position transfers the stresses created by the pressure P through shear loading through the solid thickness "t" of each individual shear block 66, 67, 80. See FIGS. 9 and 10. The holding band 60 in the contracted position retracts from the groove 26 in the hub 20 to allow the door 30 to disengage from the hub 20 and be opened, thereby exposing access port 12. See FIG. 8.

Figure 9:
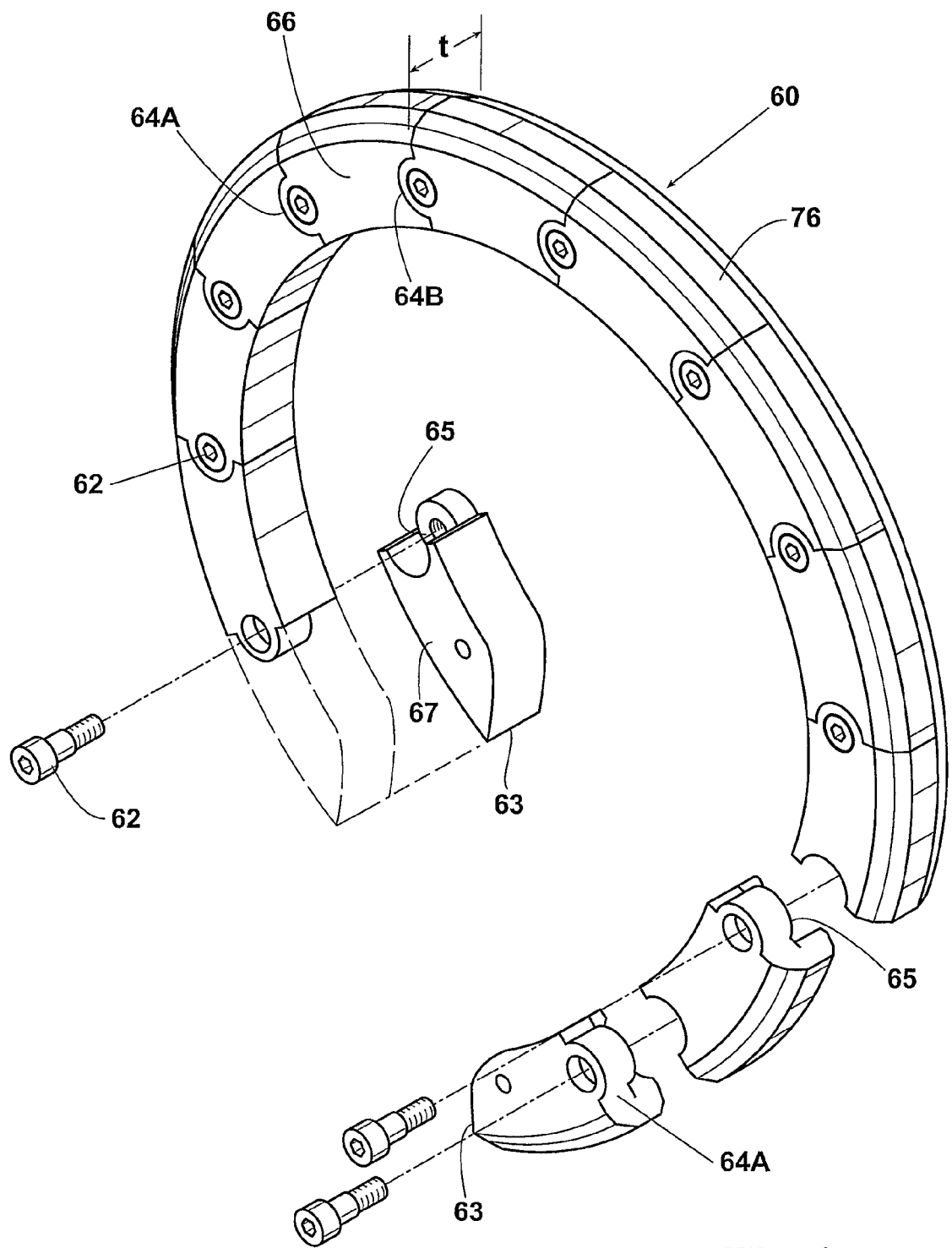
FIG. 9 illustrates an embodiment of the holding band in which the shear blocks are all linked one to another by pins. Actuating the holding band operating handle will retract all of the shear blocks from their engagement in the hub.

Referring to FIG. 9, the shear blocks 66, 67 are all linked one to another by pins 62 so that the one motion of actuating the holding band operating handle 68 will retract all of the shear blocks 66, 67 from their engagement in the hub 20. Each mid-band shear block 66 has a convex and concave arcuate-shaped end 64A and 64B, respectively. The ends 64 are formed so that end 64A of one block 66 is received by end 64 of an adjacent block 66. Similarly, each end-band shear blocks 67 has either a convex or a concave arcuate-shaped end 64A or 64B depending on whether an odd or even number of mid-band shear blocks 66 is used. An opposing end 63 of end-band shear block 67 is in communication with keystone shear block 80. Each end 64 has a recess 65 for receiving the opposing, complementary end 64 of an adjacent shear block 66 or 67. Each pair of adjacent mid-band shear blocks 66 are interconnected by a pin 62. Pin 62 also connects end 64 of the end-band shear block 67 to the adjacent shear block 66.

Figure 10:
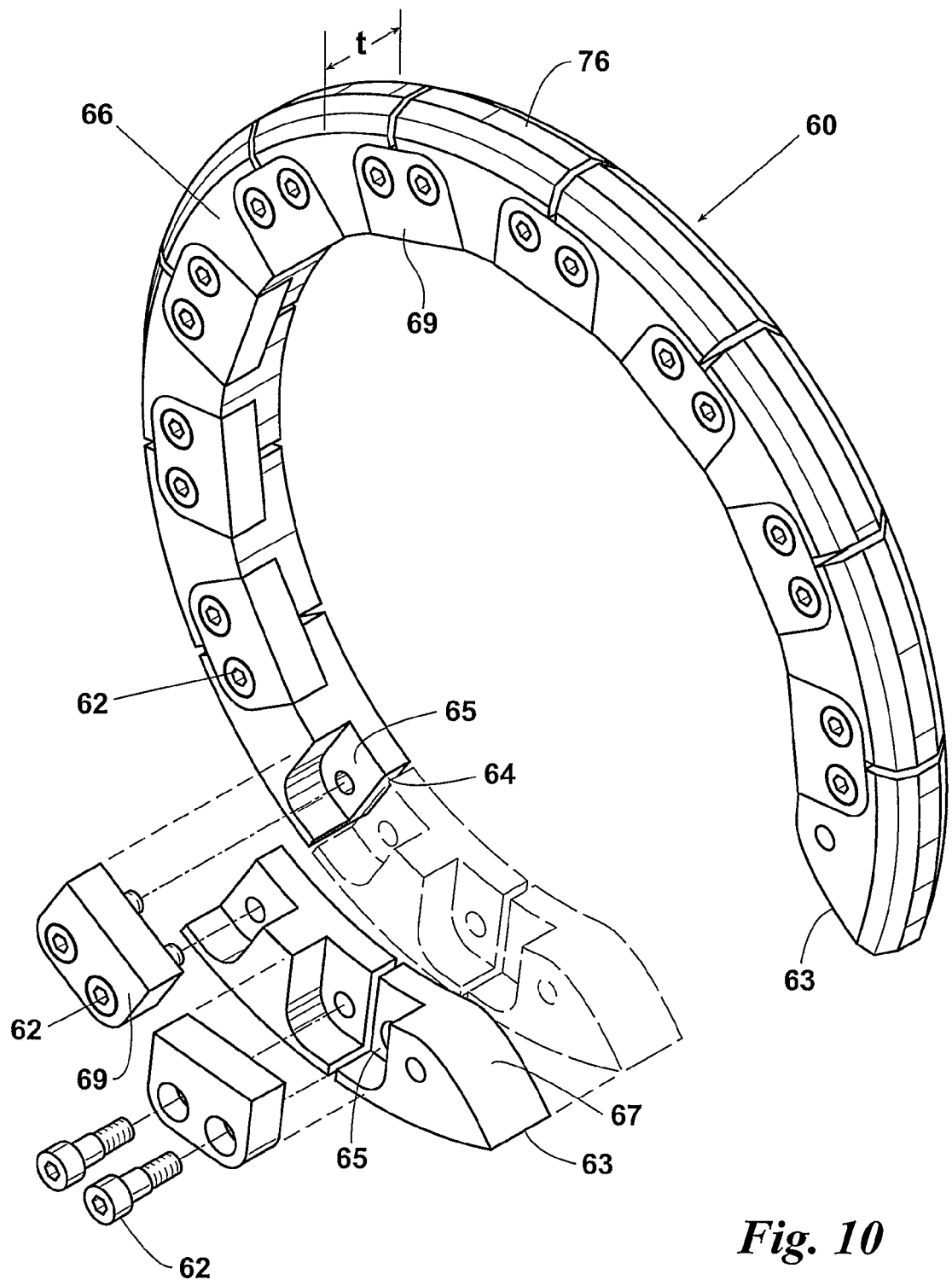
FIG. 10 illustrates an alternate embodiment of the holding band in which the mid-band shear blocks and end-band shear blocks have flat ends and a recess for receiving a plate link and pins.

The configuration of the interconnected shear blocks 66, 67 provides a limited range of rotation of each shear block 66, 67 relative to an adjacent shear block 66. This rotation is what allows the entire holding band 60 to contract from an expanded-engaged position into the open-retracted position. FIG. 10 illustrates an alternate embodiment of holding band 60 in which the mid-band shear blocks 66 and end-band shear blocks 67 have flat ends 64 and a recess 65 for receiving a of a plate link 69 and pins 62. Again, each shear block 66, 67 has a limited range of rotation relative to an adjacent shear block 66.

Returning to FIGS. 1 to 4, the keystone shear block 80 is the final shear block of the holding band 60. The keystone shear block 80 is restricted to a vertical movement and completes the engagement with the groove 26 in the hub 20 when holding band 60 is in the expanded-engaged position. The keystone shear block 80 is also used to drive all of the remaining linked shear blocks 66, 67 of the holding band 60. The end-band shear blocks 67 place mid-band shear blocks 66 in communication with keystone shear block 80. A downward, vertical movement of the keystone shear block 80 from a central location on the door 30 and toward the edge 38 of the door 30 causes the expanding motion within the holding band 60 through the driving link 84 and handle link 70. Similarly an upward vertical movement in the keystone shear block 80 causes the holding band 60 to contract to a removed position. During the upward vertical movement of the driving link 84, standoff pins 94—which ride in arcuate-shaped slots 96 of face plate 36—maintain the position of driving link 84 relative to the collapsing holding band 60.

In the closed-engaged position all of the holding band shear blocks 66, 67 and keystone shear block 80 are held captive in the groove 26 of the hub 20. In the contracted-disengaged position the linked shear blocks 66, 67 are held against the exterior face 48 of the door 30 with tabs 90 protruding off of the side walls 32. See FIGS. 5 & 6. The side walls 32 limit the range of movement for the linked shear blocks 66, 67, forcing a concentric contracted position of the holding band 60. The side walls 32 also support the front plate 36 of closure device 10.

The keystone shear block 80 is held captive above the face 48 of the door 30 underneath the front plate 36 using standoff pins 82 to set the offset distance from the face 48 of the door 30. These standoff pins 82 are also the means to restrict the keystone shear block 80 to solely a vertical movement, as the ends 88 of the standoff pins 82 ride in a vertical slot 86 in the front plate 36. The front plate 36 extends past the circumferential edge 18 of hub 20 to provide a location for hinge post 34 to attach to front plate 36. The hinge post 34 is provided as the axis for the hinge bearing 28 to rotate around. The hinge bearings 28 are held captive in hinge arms 22 that are welded to the hub 20.

While the preferred embodiments of closure device 10 have been described with a certain degree of particularity, the phraseology and terminology employed were for purposes of description and not limitation. Many changes may be made in the details of construction and the arrangement of components without departing from the spirit and scope of this disclosure. A closure device according to this invention, therefore, is limited only by the scope of the claims, including the full range of equivalency to which each element thereof is entitled.

What is claimed is:

1. A closure device comprising:
   a hub having an access port and being connectable to a pressure chamber;
   a door sized to close off the access port; and
   a circumferential holding band carried by said door;
   said circumferential holding band having a plurality of interconnected shear blocks and a keystone shear block, said keystone shear block being in communication with said plurality of interconnected shear blocks, each said shear block having a limited rotation relative to an adjacent shear block, a portion of each said shear block and said keystone shear block capable of engaging an interior profile of said hub;
   wherein a linear movement of said keystone shear block allows the limited rotation of each said shear block, the linear movement in one direction causing said circumferential holding band to collapse within itself from an expanded-engaged position to a contracted-removed position relative to said hub and the linear movement in an opposing direction causing said circumferential holding band to expand from the contracted-removed position to the expanded-engaged position.

2. A closure device according to claim 1 further comprising the linear movement being a vertical movement.

3. A closure device according to claim 1 further comprising a plurality of shear block pins, at least one end of each said shear block being received by and pinned to an opposing end of an adjacent shear block.

4. A closure device according to claim 3 further comprising a plurality of shear block plate links.

5. A closure device according to claim 1 further comprising each shear block in said plurality of shear blocks being selected from the group consisting of a mid-band shear block and an end-band shear block.

6. A closure device according to claim 5 further comprising each said mid-band shear block having a first end and a second end, said second end of a first mid-band shear block being capable of mating to a first end of an adjacent second mid-band shear block.

7. A closure device according to claim 5 further comprising each said end-band shear block having a first end and a second end, said first end being capable of mating to an opposing end of an adjacent mid-band shear block.

8. A closure device according to claim 1 further comprising each said band shear blocks and said keystone shear block having a thickness "t" effective for transferring a stress created by a pressure acting on an inner face of said door to said hub when said holding band is in the expanded-engaged position.

9. A closure device according to claim 1 further comprising the interior profile of said hub including a circumferential groove, said groove receiving said circumferential holding band when said band is in the expanded-engaged position.

10. A closure device according to claim 1 further comprising a side wall located on an outer face of said door, said side wall being effective for retaining said circumferential holding band when said circumferential holding band is in the contracted-removed position.

11. A closure device according to claim 1 further comprising a face plate having a slot and at least one standoff pin in communication with said keystone shear block, said standoff pin riding in said slot.

12. A closure device according to claim 1 further comprising a holding band operating handle.

13. A closure device according to claim 12 further comprising a holding band driving link, said holding band driving link being in communication with said operating handle and said keystone shear block.

14. A closure device according to claim 12 further comprising a pressure warning lock, said pressure warning lock being received by a portion of said holding band operating handle.

15. A closure device carried by a door that is sized to close off an access port to a hub which is connected to a pressure chamber, the closure device comprising:
a circumferential holding band having a plurality of interconnected shear blocks and a keystone shear block, said keystone shear block being in communication with said plurality of interconnected shear blocks, each said shear block having a limited rotation relative to an adjacent shear block, a portion of each said shear block and said keystone shear block capable of engaging an interior profile of said hub;
wherein a linear movement of said keystone shear block allows the limited rotation of each said shear block, the linear movement in one direction causing said circumferential holding band to collapse within itself from an expanded-engaged position to a contracted-removed position relative to said hub and the linear movement in an opposing direction causing said circumferential holding band to expand from the contracted-removed position to the expanded-engaged position.

16. A closure device according to claim 15 wherein said keystone shear block is not connected to the plurality of interconnected shear blocks.

17. A closure device according to claim 15 wherein said keystone shear block is restricted to the linear movement as the circumferential holding band moves between the contracted-removed position and the expanded-engaged position.

* * * * *